United States Patent [19]

Barclay et al.

[11] Patent Number: 4,704,871
[45] Date of Patent: Nov. 10, 1987

[54] MAGNETIC REFRIGERATION APPARATUS WITH BELT OF FERRO OR PARAMAGNETIC MATERIAL

[75] Inventors: John A. Barclay, Madison; Walter F. Stewart, Marshall, both of Wis.; Michael D. Henke; Kenneth E. Kalash, both of Los Alamos, N. Mex.

[73] Assignee: The United States of America as represented by the United States Department of Energy, Washington, D.C.

[21] Appl. No.: 848,001

[22] Filed: Apr. 3, 1986

[51] Int. Cl.[4] .............................................. F25B 21/02
[52] U.S. Cl. ......................................................... 62/3
[58] Field of Search .................................. 62/3, 6, 467

[56] References Cited

U.S. PATENT DOCUMENTS

| | | |
|---|---|---|
| 428,057 | 5/1890 | Tesla . |
| 2,510,800 | 6/1950 | Chilowsky . |
| 2,589,775 | 3/1952 | Chilowsky ................................ 62/1 |
| 2,619,603 | 11/1952 | Chilowsky . |
| 3,108,444 | 10/1963 | Kahn ........................................ 62/3 |
| 3,154,927 | 11/1964 | Simon ...................................... 62/3 |
| 3,393,526 | 7/1968 | Pearl ........................................ 62/3 |
| 3,413,814 | 12/1968 | van Geuns ............................... 62/3 |
| 3,743,866 | 7/1973 | Pirc . |
| 3,774,404 | 11/1973 | Walker et al. ........................... 62/3 |
| 3,841,107 | 10/1974 | Clark ....................................... 62/3 |
| 4,033,734 | 7/1977 | Steyert et al. ........................... 62/3 |
| 4,069,028 | 1/1978 | Brown ..................................... 62/3 |
| 4,107,935 | 8/1978 | Steyert .................................... 62/3 |
| 4,136,525 | 1/1979 | Van Vechten .......................... 62/3 |
| 4,332,135 | 6/1982 | Barclay et al. .......................... 62/3 |
| 4,408,463 | 10/1983 | Barclay ................................... 62/3 |
| 4,429,539 | 2/1984 | Leach ...................................... 62/6 |
| 4,457,135 | 7/1984 | Hakuraku et al. ...................... 62/3 |
| 4,459,811 | 7/1984 | Barclay et al. .......................... 62/3 |
| 4,464,903 | 8/1984 | Nakagome et al. ..................... 62/3 |
| 4,507,927 | 4/1985 | Barclay ................................... 62/3 |
| 4,507,928 | 4/1985 | Johnson .................................. 62/3 |
| 4,509,334 | 4/1985 | Nakagome et al. ................. 62/3 X |
| 4,532,770 | 8/1985 | Hakuraku et al. ...................... 62/3 |
| 4,535,595 | 8/1985 | Keller et al. ............................ 62/3 |
| 4,537,033 | 8/1985 | Kamil ...................................... 62/3 |
| 4,554,790 | 11/1985 | Nakagome et al. ..................... 62/3 |
| 4,599,866 | 7/1986 | Nakagome et al. ..................... 62/3 |
| 4,625,519 | 12/1986 | Hakuraku et al. ...................... 62/3 |

OTHER PUBLICATIONS

J. A. Barclay, "An Analysis of Liquefaction of Helium Using Magnetic Refrigerators", Los Alamos National Laboratory report LA-8991, pp. 12-16, (Dec. 1981).
J. A. Barclay, "Can Magnetic Refrigerators Liquefy Hydrogen at High Efficiency?", 20th Joint ASME/AlChE National Heat Transfer Conference, Milwaukee, Wis., Aug. 2-5, 1981, (ASME Publication 81-HI-82), pp. 1-8.
J. R. van Geuns, "A Study of a New Magnetic Refrigerating Cycle", N. V. Philips Research report, Gloeilampenfabrieken, Eindhoven, Netherlands, (Jun. 1966), pp. 46, 60, 65, 82, 86, and 93.
G. V. Brown, "Magnetic Heat Pumping Near Room Temperature", J. Appl. Phys. 47, No. 8, 3673-3680, (1976).
J. A. Barclay et al., "A Reciprocating Magnetic Refrigerator for 2-4 K Operation: Initial Results", J. Appl. Phys. 50, No. 9, 5870-5877, (1979).

(List continued on next page.)

Primary Examiner—Albert J. Makay
Assistant Examiner—Steven E. Warner
Attorney, Agent, or Firm—Joseph M. Hageman; Ray G. Wilson; Judson R. Hightower

[57] ABSTRACT

A magnetic refrigerator operating in the 12 to 77K range utilizes a belt which carries ferromagnetic or paramagnetic material and which is disposed in a loop which passes through the center of a solenoidal magnet to achieve cooling. The magnetic material carried by the belt, which can be blocks in frames of a linked belt, can be a mixture of substances with different Curie temperatures arranged such that the Curie temperatures progressively increase from one edge of the belt to the other. This magnetic refrigerator can be used to cool and liquefy hydrogen or other fluids.

26 Claims, 5 Drawing Figures

OTHER PUBLICATIONS

J. A. Barclay et al., "Magnetic Refrigeration for Space Applications. Report on a Design Study", Los Alamos Scientific Laboratory report LA-8134, (Feb. 1980).

T. Hashimoto et al., "The Magnetic Refrigeration Characteristics of Several Magnetic Refrigerants Below 20K: I Magnetocaloric Effect", Proceedings of CEC, San Diego, Calif., (1981).

T. Hashimoto et al., "A New Usage of Anisotropic Magnetic Compound for the Magnetic Refrigerant", Proceedings of CEC, San Diego, Calif., (1981).

A. F. Lacaze et al., "A Gadolinium Gallium Garnet Double Acting Reciprocating Magnetic Refrigerator", CEC 81, San Diego, Calif., paper HB 6, pp. 1-8.

A. F. Lacaze et al., "Thermodynamical Analysis of a Double Acting Reciprocating Magnetic Refrigerator", Proceedings of CEC, San Diego, Calif., (1981).

T. Numazawa et al., "The Magnetic Refrigeration Characteristics of Several Magnetic Refrigerants Below 20K: II Thermal Properties", Proceedings of CEC, San Diego, Calif., (1981).

M. Shiino, "Analysis of Regenerative Operations in Magnetic Refrigeration", Proceedings of CEC, San Diego, Calif., (1981).

Takasu Hashimoto et al., "The Carnot Type Magnetic Refrigeration Below 4.2K: Computer Simulation", Physica 108B, 1105, (1981).

J. A. Barclay, "Magnetic Refrigeration for Spacecraft Systems", Amer. Soc. Mech. Eng., Intersociety Conf. on Environmental Systems, San Francisco, Calif., Jul. 13-15, 1981, (ASME Publication 81-ENAs-47), pp. 1-7.

C. Delpuech et al., "Double Acting Reciprocating Magnetic Refrigerator: First Experiments", Cryogenics, 579-584, (Oct. 1981).

J. A. Barclay, "Use of a Ferrofluid as the Heat-Exchange Fluid in a Magnetic Refrigerator", J. Appl. Phys. 53, No. 4, 2887-2894, (1982).

J. A. Barclay et al., "Materials for Magnetic Refrigeration Between 2K and 20K", Cryogenics, 73-80, (Feb. 1982).

A. F. Lacaze et al., "Theromodynamical Analysis of a Double Acting Reciprocating Magnetic Refrigerator", Proc. of ICEC-9, Kobe, Japan, May 1982, (Butterworth, Guilford 1983).

H. Nakagome et al., "The Helium Magnetic Refrigerator I-Development and Experimental Results-", Proceedings of CEC and CMC: FC-10, Colorado Springs, Colo., (1983).

T. Numazawa et al., "The Helium Magnetic Refrigerator II: Precise Experimental Results and Further Study", Proceedings of CEC and CMC: FC-11, Colorado Springs, Colo., (1983).

A. F. Lacaze et al., "Efficiency Improvements of a Double Acting Reciprocating Magnetic Refrigerator", Cryogenics, 427-432, (Aug. 1983).

J. A. Barclay, "A Comparison of the Efficiency of Gas and Magnetic Refrigerators", Los Alamos National Laboratory report LA-UR-84-0212, (1984).

A. F. Lacaze et al., "Double Acting Reciprocating Magnetic Refrigerator: Recent Improvements", Adv. Cryog. Eng. 29, 573, (1984).

MAGNETIC REFRIGERATION APPARATUS WITH BELT OF FERRO OR PARAMAGNETIC MATERIAL

BACKGROUND OF THE INVENTION

This invention relates to magnetic refrigeration and more particularly to refrigeration between about 12 to about 77K with an apparatus utilizing a belt carrying ferro or paramagnetic material having Curie temperatures between 15K and 85K. This invention is the result of a contract with the Department of Energy (Contract No. W-7405-ENG-36).

Magnetic refrigerators such as disclosed in U.S. Pat. No. 4,332,135 issued to Barclay et al. and U.S. Pat. No. 4,408,463 issued to Barclay are known and the two patents are specifically incorporated herein by reference. Such magnetic refrigerators utilized paramagnetic or ferromagnetic material and moved the material in and out of the magnetic field, causing the material to magnetize and demagnetize. U.S. Pat. No. 4,408,463 showed ferro or paramagnetic porous material disposed within a wheel with the material nearest the inside rim having a lower Curie temperature than the material near the outer rim. One section of the circumference of the wheel was disposed within a solenoid-shaped magnet. The geometry of this arrangement limited the thickness of the wheel rim that could pass through the open bore of the solenoidal-shaped magnet. Additionally, this arrangement allowed only one refrigeration cycle per revolution of the wheel. Assembly of the refrigerator was also difficult because of the need for a split wheel and a split housing around the wheel.

There was, however, still a need for an efficient arrangement of magnet and magnetic material which would allow more magnetic material to be exposed to the magnetic field for a given size of magnet. In addition, a need existed for a magnetic refrigerator design that had an easily assembled housing surrounding the magnetic material travel path and was at the same time compact. The instant invention utilizes a belt configuration of magnetic material which can more completely fill the bore of a solenoidal-shaped magnet, and yet not require a split belt or a split housing. Additionally, the belt can allow two passes through the magnetic field for each complete circuit of the loop path that the belt is shaped into.

SUMMARY OF THE INVENTION

One object of the present invention is to provide highly efficient refrigeration over a range of from about 12 to about 77K.

Another object of the present invention is to allow more magnetic material to be exposed to a magnetic field inside the bore of the solenoidal-shaped magnet.

Another object of the present invention is to provide for two refrigeration cycles per complete circuit of a magnetic belt.

Another object of the present invention is to provide for the most efficient geometry for producing a magnetic field on the magnetic material.

Another object of the present invention is to provide for ease of assembly of the housing surrounding the magnetic material travel path, and yet still provide for a compact apparatus.

Yet another object of the present invention is to provide for a modular nature of magnetic material such that a breakdown at any one point of magnetic material will not necessitate the long term removal for repair of all magnetic material from the refrigeration apparatus.

A further object of the present invention is to provide for a block geometry for the magnetic material such that heat transfer to a flowing fluid is facilitated and magnetic forces are linearly compressive.

Another object of the present invention is to provide a heat transfer area where rectangular manifolds with flow impedance devices can direct fluid flow through the magnetic material.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise an about 12 to about 77K refrigeration apparatus comprising: a belt disposed in a loop around at least two wheels, with at least one wheel being a drive wheel; ferromagnetic or paramagnetic porous material carried by said belt, said material comprising at least one substance, said substance having a Curie temperature between 15K and 85K; a magnetic field generating means disposed to produce a magnetic field surrounding at least one portion of said loop with said magnetic field essentially parallel to the direction of movement of said belt while said belt is in said magnetic field; means for driving said drive wheel; a fluid effective to transfer heat at temperatures between about 12 and about 85K; first and second higher temperature fluid manifolds directing said fluid from said first manifold adjacent to first edge of said material, through said material into said second manifold adjacent to second edge of said material, while said material is in a region of greater magnetic field; first and second lower temperature fluid manifolds directing said fluid from first manifold adjacent to said second edge of said material, through said material to said second manifold adjacent to said first edge of said material, while said material is in a region of lesser magnetic field; at least one thermal load exchange means; a heat rejection exchange means; and means for pumping and transporting fluid from said heat rejection exchange means through said first and second higher temperature manifolds to said thermal load exchange means, from said thermal load exchange means through said first and second lower temperature manifolds, then back to said heat rejection means.

An advantage of the present invention is derived from the greater amount of magnetic material which can pass through the bore of the magnet at any one time for a given size of magnet.

Another advantage of the present invention is the greater cooling capacity derived from having the same magnetic material pass through the magnetic field twice during one complete circuit of the loop path.

Yet another advantage of the present invention is the modular nature of the magnetic material within the apparatus sure that a breakdown at one point in the magnetic material does not necessitate the long term removal for repair of all magnetic material from the apparatus.

A further advantage of the present invention is the block geometry of the porous magnetic material which allows better flow patterns for the fluid which facilitates greater heat transfer and also makes any forces from the magnetic field compressive rather than deflective (from desired travel path for magnetic material).

Another advantage of the present invention is the better fluid flow pattern through the magnetic material due to the rectangular manifolds and more effective flow impedance devices between the manifold edge and block of magnetic material.

Yet still another advantage of the instant invention is the combined greater efficiency of the refrigeration apparatus for operation in the about 12 to about 77K region.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENTS

Figure 1:
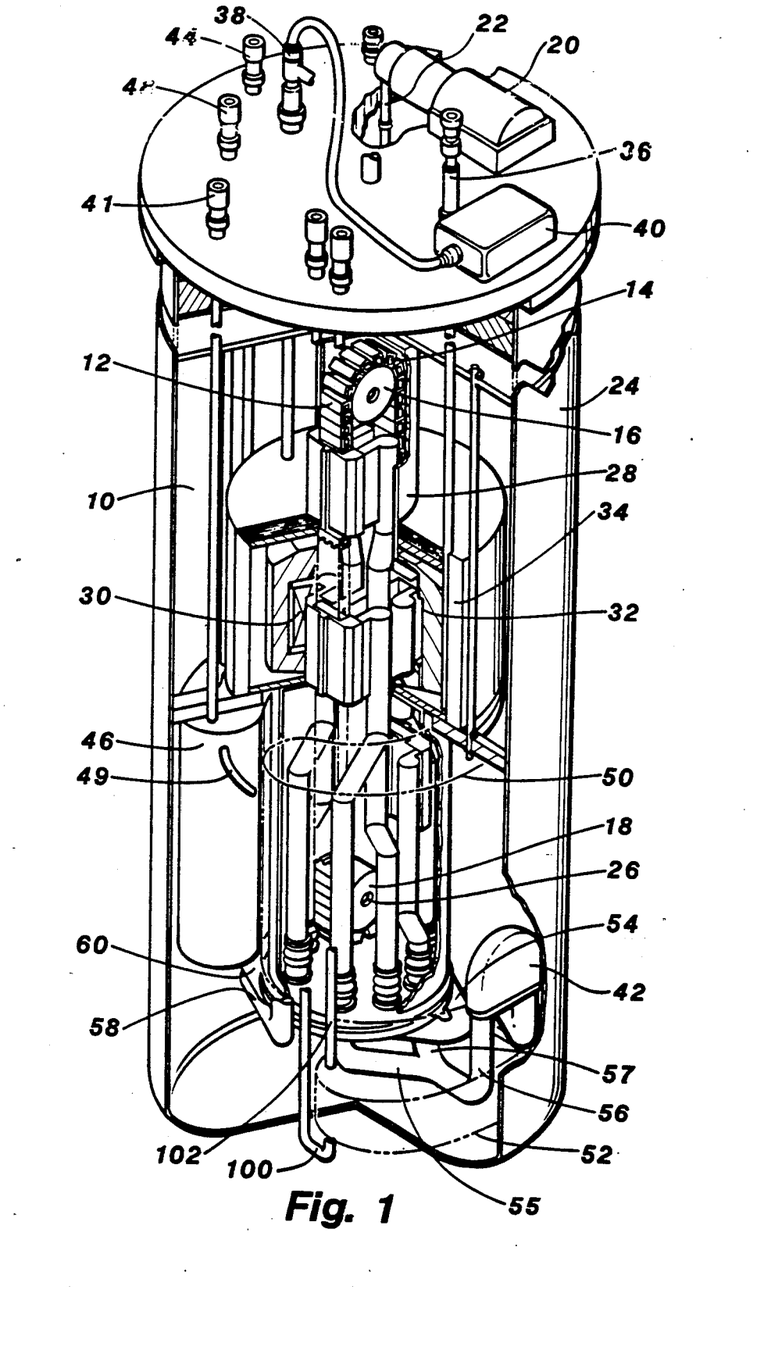
FIG. 1 is a cross-sectional perspective of one embodiment of the invention.

Referring now to FIG. 1, a cross-sectional perspective of one embodiment of the invention with a linked belt of magnetic material, the invention 10 is used to cool a second fluid. The linked belt 12 can be composed of blocks 14 of ferro or paramagnetic porous material disposed within frames which are flexibly attached to each other. The porous block 14 can be composed of a plurality of layers of ferromagnetic or paramagnetic porous material where the layer nearest the first edge is composed of a substance that has a Curie temperature near 15K, while the layer nearest the second edge is composed of a substance that has a Curie temperature near 85K. Any interstitial layers between these two edge layers can be composed of additional substances which have increasing Curie temperatures from next to the first edge to the second edge in accordance with their location. The layers can also have openings disposed substantially parallel to the movement of the fluid through the blocks 14. The blocks 14 can also be made up of a plurality of sheets disposed substantially parallel to the movement of the fluid. Each sheet can be composed of a plurality of substances with the zone of the sheet nearest the first edge of the block 14 having the greatest amount of a substance with a Curie temperature nearest 15K, and the zone of the sheet nearest the second edge having the greatest amount of substance with a Curie temperature nearest 85K. Any intervening zones of the sheet have increasing amounts of a substance or substances with increasing Curie temperatures in accordance with the zones' location. The frames of linked belt 12 can also contain layered cages, where the cages contain porous particles of paramagnetic or ferromagnetic material. Instead of a linked belt, the belt can be formed by attaching the porous paramagnetic or ferromagnetic material to a carrier belt composed of a material that can withstand very cold temperatures without loosing flexibility or fabricated in such a manner that allows the motion required to execute the loop path of the belt. The magnetic material on or in the belt may comprise one or more of the following compounds: GdNi, GdPd, GdRh, $ErAl_2$, $GdEr_{19}Al_{40}$, $Gd_2Er_{18}Al_{40}$, and $Gd_3Er_{17}Al_{40}$.

The linked belt 12 is disposed in a loop configuration around two wheels, one wheel 16 and a second drive wheel 18. Drive wheel 18 is driven by drive motor 20 through drive linkage. The drive linkage can be composed of a drive shaft 22 which penetrates cold box 24 or preferably an indirect coupling, such as magnetic, from drive motor 20 to drive shaft 22. Drive shaft 22 ends in a gear which engages a gear on the end of secondary drive shaft 26. Preferably, secondary drive shaft 26 also has an indirect coupling means when it transmits power through housing 28 that surrounds the linked belt 12. Secondary drive shaft 26 engages drive wheel 18. Drive wheel 18 can frictionally engage linked belt 12 or it can engage linked belt 12 by a positive drive mechanism such as a cog mechanism.

Housing 28 defines a space within which the linked belt 12 can travel in a looped configuration. At a short distance toward the drive wheel 18 from the mid point on the center line between the wheel 16 and drive wheel 18, the housing 28 narrows. This narrowing allows the housing 28 to be inserted through the bore of a magnet 30. The magnet 30 is surrounded by a magnetic flux return path 32 which can be composed of soft iron or other highly magnetically permeable material. The magnet can be a superconducting magnet composed of NbTi or other superconducting wire. The magnet 30 can be operated in a persistent superconducting mode. The magnet 30 and the magnetic flux return path 32 are surrounded by a Dewar 34. The Dewar 34 has two ports, a liquid helium fill port 36 and a power lead and instrumentation and vent port 38.

Cold box 24 is also penetrated by leads going to sensor and control box 40. The power leads go to magnet 30 and a pump 42. Some of the sensors from sensor and control box 40 penetrate the housing 28 to connect to measuring instruments within the housing 28. Cold box 24 is further penetrated by a liquid nitrogen fill port 41 and vent port 44 which allows liquid nitrogen to flow to a 77K heat exchanger 46. 77K is, of course, the boiling point of liquid nitrogen at 1 atmosphere pressure. Finally, cold box 24 is penetrated by second fluid fill port 48. This second fluid fill port 48 allows the second fluid which is to be either cooled or liquefied to flow through the 77K heat exchanger 46 which is the heat rejection exchange means. After the second fluid is cooled to 77K, it flows through heat exchanger connecting pipe 49 to main heat exchanger 50 which is the thermal load exchange means. From the main heat exchanger 50, the second fluid flows through pipe 98 into reservoir 52, which is drained by drain pipe 100 and vented by reservoir vent pipe line 102. If the second fluid to be cooled is hydrogen, an ortho-to-para catalytic converter can be disposed within the main heat exchanger 50, and one or more additional ortho-to-para catalytic converters can also be disposed within the 77K heat exchanger 46.

Housing 28 is penetrated by numerous ports to admit fluid going to or from the 77K heat exchanger 46 and main heat exchanger 50. This fluid can be gaseous helium. The arbitrarily designated first pipe segment 54 carries fluid from a 77K heat exchanger 46 at 77K to just short of housing 28 where the first pipe segment 54 splits. When temperatures are given for fluid flowing in various pipe segments, it should be understood that the actual temperature of the fluid may vary several kelvins throughout the cross section of the pipe and most especially through time. The fluid from 77K heat exchanger 46 at 77K then goes through the housing 28 and proceeds to the two separate regions wherein linked belt 12 has emerged from a region of high magnetic field into a region of low magnetic field. Second pipe segment 56 carrying 85K fluid runs from a junction of two pipes 55 and 57 emerging from housing 28 and runs to the pump 42 and then hence to the 77K heat exchanger 46. The fluid exiting from housing 28 comes from a region of high magnetic field. Third pipe segment 58 carrying 20K fluid runs from main heat exchanger 50 to a split in the pipe just before the third pipe segment enters housing 28. The fluid coming from main heat exchanger 50 enters the housing 28 and goes to a region of high magnetic field. Fourth pipe segment 60 carries 12K fluid from a junction of two pipes penetrating housing 28 and goes to main heat exchanger 50. The fluid exiting housing 28 came from a region wherein the blocks have emerged from a region of high magnetic field into a region of lower magnetic field.

Figure 2:
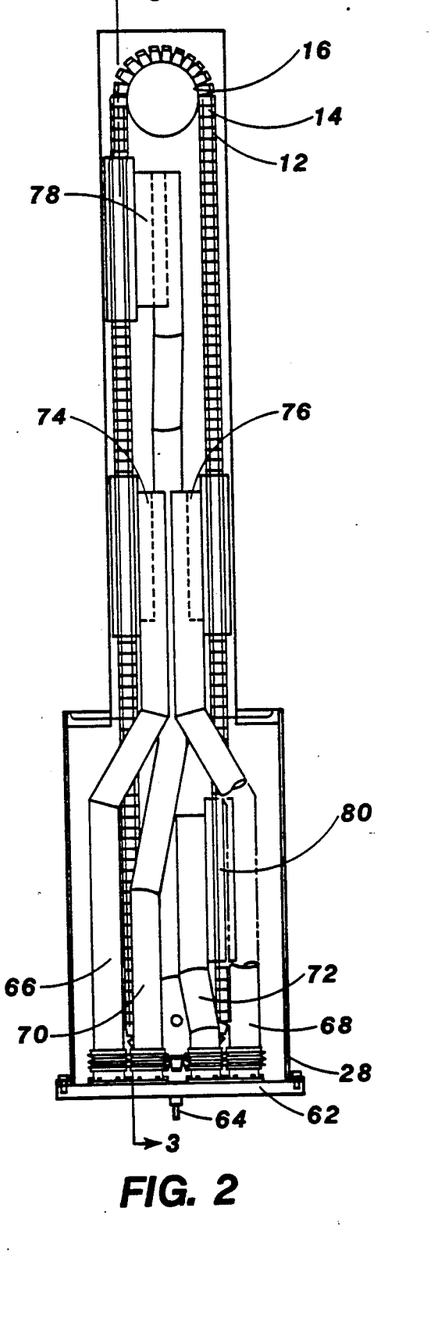
FIG. 2 is an enlarged elevation of part of FIG. 1.

Referring now to FIG. 2 which is an enlarged elevation of the structure within housing 28, previously identified parts such as wheel 16 and linked belt 12 can be seen. Penetrating refrigerator back plate 62, which is a part of housing 28, are openings which lead to eight pipes, only four of which are shown in FIG. 2 due to the symmetry of the apparatus. Additionally, an instrumentation and gas prefill pump down port 64 penetrates refrigerator back plate 62. The refrigeration apparatus is also symmetrical across the longitudinal center line of housing 28. This means that the two outside pipes shown carry 85K gas out, and will be called 85K out pipes 66 and 68. Similarly, the two interior pipes are 77K in pipes 70 and 72. Hidden by the 85K out pipes 66 and 68 are a pair of 20K in gas pipes and hidden by the 77K in pipes 70 and 72 are a pair of about 12K out gas pipes. 85K out pipes 66 and 68 connect respectively to second higher temperature manifold 74 and fourth higher temperature manifold 76. Additionally, 77K in pipes 70 and 72 connect respectively to first lower temperature manifold 78 and third lower temperature manifold 80. It should be emphasized that the designation of the order of the lower temperature manifolds is purely arbitrary depending upon the starting point of the rotation of linked belt 12.

Figure 3:
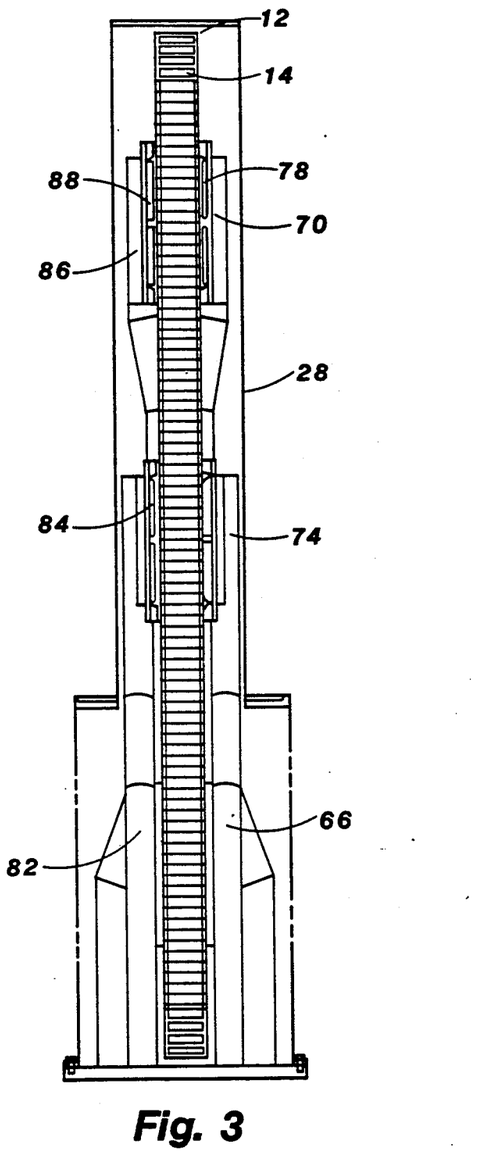
FIG. 3 is a cross-sectional elevation of part of FIG. 2.

Referring now to FIG. 3, which is a cross-sectional elevation taken along view line 3—3 in FIG. 2, the blocks 14 of linked belt 12 are shown in their wider dimension. Previously identified second higher temperature manifold 74 and 85K out pipe 66 are to the right of the linked belt 12. Previously hidden 20K in pipe 82 connects to first higher temperature manifold 84. This means that the gas flow within the region of higher magnetic field shown in FIG. 3 is from left to right. Previously identified 77K in pipe 70 connects to first lower temperature manifold 78 at the top of FIG. 3. Previously hidden 15K out pipe 86 is shown connecting to second lower temperature manifold 88 at the top of Figure 3. This means that the flow of the gas across blocks 14 of linked belt 12 is from right to left in the region of lower magnetic field. Flow impedance devices can also be provided between the manifolds and the edges of the linked belt 12, as well as between the manifolds themselves, to cause the fluid to follow the desired flow paths which are paths of least resistance. Housing 28 is filled with static fluid which has accumulated from leakage past flow impedance devices.

Following a single block 14 of magnetic material through a complete circuit of the loop defined by the wheel 16 and drive wheel 18, will illustrate the operation of the invention. Arbitrarily designating the starting point as just to the right bottom of wheel 16 in FIG. 2, the block will travel a distance before entering the region of highest magnetic field. While entering the field, the block 14 will experience an elevation in temperature due to the magnetization. However, at the same time the block 14 will be perfused by fluid emerging from the third higher temperature manifold which is at about 20K. While the fluid is traversing the block 14, the fluid picks up enough heat to increase the fluid's temperature to 85K. The fluid emerging from block 14 enters fourth higher temperature manifold 76 and flows out through pipe 68. The block 14 now leaves the region of highest magnetic field and enters a region of lower magnetic field adjacent to third lower temperature manifold 80. Fluid initially at 77K then traverses the block 14 and exits at about 12K into fourth lower temperature manifold. The block now travels around drive wheel 18 and eventually reaches the region of highest magnetic field adjacent to first high temperature manifold 84. There about 20K fluid from the about 20K in pipe 82 flows through first high temperature manifold 84 into block 14. The fluid after emerging from block 14 enters second higher temperature manifold 74 at a temperature of 85K and flows out of the refrigeration apparatus via 85K out pipe 66. Next block 14 leaves the region of highest magnetic field and enters a region adjacent to first lower temperature manifold 78. Fluid that is at 77K emerges from first lower temperature manifold 78 after traveling through 77K in pipe 70 and enters block 14. During the transit of block 14, the fluid cools to 15K and afterwards enters second lower temperature manifold. The block 14 next goes around wheel 16 and returns to its starting point.

Figure 4:
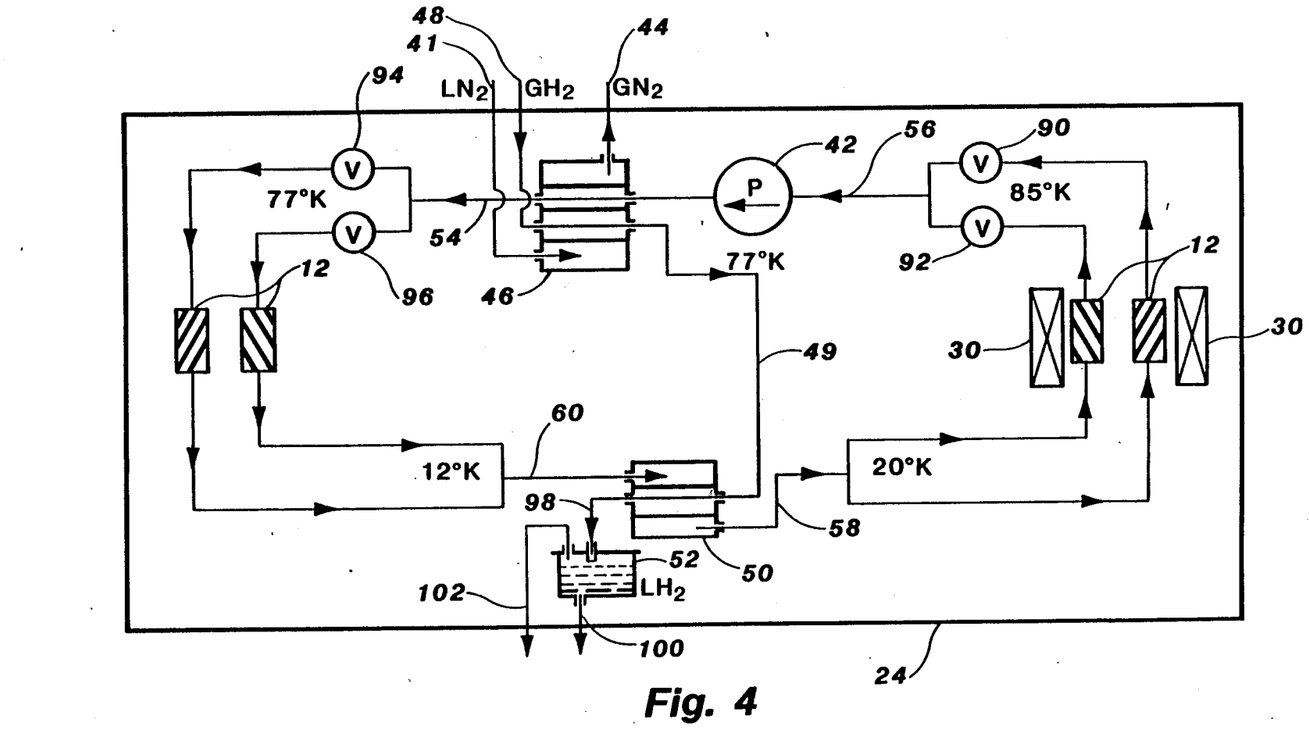
FIG. 4 is a schematic showing the flow paths of the fluid when the fluid is at different temperatures.

Referring now to FIG. 4, a schematic showing the flow paths for the fluid when the fluid is at different temperatures, the linked belt 12 is shown four times, twice inside and twice outside the magnet 30. The pump 42 forces the fluid throughout the apparatus of invention 10. Valves 90, 92, 94, 96 control the flow of fluid immediately going to the pump 42 and immediately coming from the 77K heat exchanger 46. Second fluid which may be gaseous hydrogen, helium, or neon is shown coming from outside cold box 24 and entering through second fluid fill port 48 and going to 77K heat exchanger 46. After passing through 77K heat exchanger 46, the second fluid travels via heat exchanger connecting pipe segment 49 to main heat exchanger 50 where the second fluid is turned into a desired product, such as liquid hydrogen, slush hydrogen (a mixture of liquid and solid hydrogen), liquid neon, or cooled helium gas. The desired product is then conveyed to liquid reservoir 52 by drain pipe 98. The desired product can be removed from liquid reservoir 52 by outlet pipe 100, also shown in FIG. 1.

Arbitrarily starting the circuit description for the fluid as it emerges from the pump 42 and the fluid is at 85K, the fluid enters 77K heat exchanger 46 which is cooled by liquid nitrogen at 77K. The liquid nitrogen enters cold box 24 via liquid nitrogen fill port 41 and the vaporized nitrogen leaves via vent port 44. The liquid nitrogen bath could be replaced by another refrigerator cold stage. The fluid leaves the 77K heat exchanger 46 at 77K and flows through first pipe segment 54 to the split in the pipe 54. After the fluid flow is split it goes through valves 94 and 96 and to two parts of the linked belt 12 in the regions of less magnetic field where it is cooled to 12K. The separate flows of 12K fluid are combined and flow through fourth pipe segment 60 to main heat exchanger 50. In main heat exchanger 50 the fluid is warmed to 20K, or whatever temperature as dictated by the choice of the second fluid, by the cooling of the second fluid. The 20K fluid travels through third pipe segment 58 to the split in the pipe 58. After the fluid flow is split the fluid goes to and through linked belt 12 when linked belt 12 is in the region of high magnetic field. The fluid as it diffuses through the blocks 14 of the linked belt 12 picks up heat and emerges from the blocks 14 at 85K. The separate flows go through valves 90 and 92 before being combined together to flow through second pipe segment 56 on the way to pump 42. From pump 42 the 85K fluid starts the circuit again when it enters the 77K heat exchanger 46.

Figure 5:
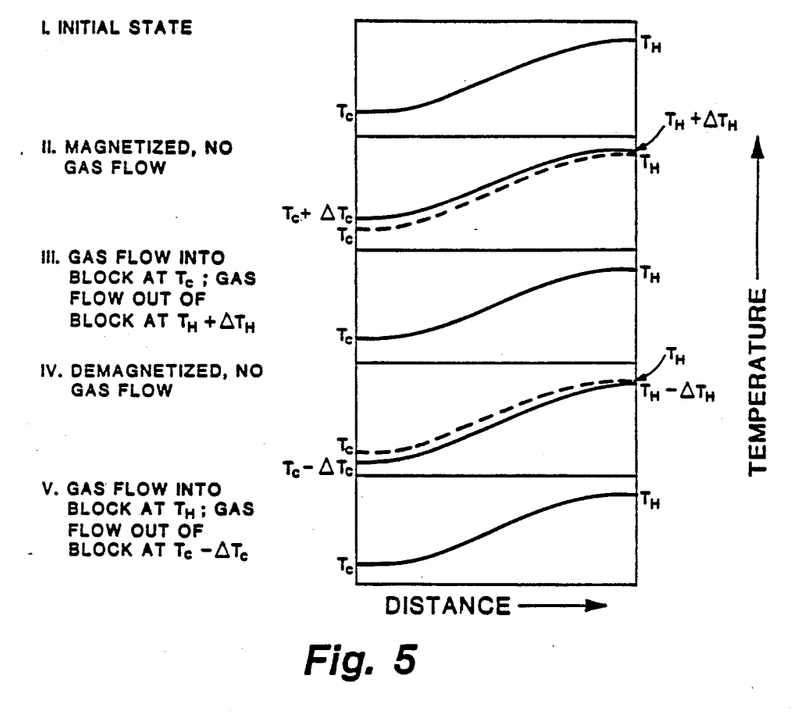
FIG. 5 illustrates temperature as a function of distance from one edge of a block of magnetic material through a magnetization-demagnetization cycle.

The varying temperature profile of block 14 during its first half of the circuit is shown in FIG. 5. As previously described, the blocks 14 can comprise a series of different ferromagnetic materials with different Curie temperatures, gradually decreasing from a hot-bath temperature $T_H$ to a cold-bath temperature $T_C$. Assume that a temperature gradient is nearly uniform but displaced to the left of center in the block 14 as shown in the top frame of FIG. 5. Those skilled in the art will appreciate that first start up from a warm condition $T_H$ exists everywhere and it will take several cycles to reach the condition we are discussing for a sample illustration, as we are starting with the temperature gradient already established. Upon application of a magnetic field, the temperature all along the block 14 will adiabatically increase by $\Delta T$ which is about 8 to 10K for a contemplated 8 tesla field. It will be appreciated that one of the characteristics of magnetic refrigeration is that $\Delta T$ is roughly independent of the temperature T for each material near its Curie temperature. After the field is applied, helium or hydrogen gas or other suitable fluid at a temperature $T_C$ is pushed through the block 14 from the cold end which is now $T_C + \Delta T_C$ to the warm end. As a gas entering the block 14 at $T_C$ travels through the block 14, the fluid will warm and the block 14 will cool. A thermal wave front will be established as shown in the middle frame of FIG. 5. The overall wave front of magnitude $T_H - T_C$ will propagate through the block 14 to the right in the middle frame of FIG. 5 as fluid continues to flow into the block 14 at $T_C$. The fluid leaves the block 14 at $T_H + \Delta T_H$ until the wavefront arrives at the hot end of the block 14 at which time the temperature of the exiting fluid drops to $T_H$. When this happens, the fluid flow through the block 14 is stopped and the block 14 is adiabatically demagnetized. Temperatures all along the block 14 drop by $\Delta T$ as shown in the fourth frame of FIG. 5, in preparation for the reverse flow of fluid. Fluid that came out of the block 14 at $T_H + \Delta T_H$ during the magnetized stage is put through a heat exchanger 46 and cooled to $T_H$ before it is pushed back into the block after demagnetization. Another wave front of magnitude $T_H - T_C$ is established, traveling in the opposite direction to the first thermal wavefront as shown in the bottom frame of FIG. 5. The fluid exits the cold end at $T_C - \Delta T_C$ and is placed in contact with a load in heat exchanger 50 to be heated to $T_C$.

When the fluid temperature at the cold end of the block 14 increases from $T_C - \Delta T_C$ to $T_C$, the fluid flow is stopped and the cycle now repeats as the block 14 is once again magnetized. During the operation of the refrigeration apparatus 10 illustrated in the previous Figures, $T_C$ can be about 15 to 20K, $T_H + \Delta T_H$ is 85K, $T_C - \Delta T_C$ is 12K and $T_H$ is 77K.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An about 12 to about 77K refrigeration apparatus comprising:
    a belt disposed in a loop around at least two wheels, with at least one wheel being a drive wheel;
    ferromagnetic or paramagnetic porous material carried by said belt, said material comprising at least one substance, said substance having a Curie temperature between 15K and 85K;
    a magnetic field generating means disposed to produce a magnetic field surrounding at least one portion of said loop with said magnetic field essentially parallel to the direction of movement of said belt while said belt is in said magnetic field;
    means for driving said drive wheel;
    a fluid effective to transfer heat at temperatures between about 12 and about 85K;
    first and second higher temperature fluid manifolds directing said fluid from said first manifold adjacent to first edge of said material, through said material into said second manifold adjacent to second edge of said material, while said material is in a region of greater magnetic field;
    first and second lower temperature fluid manifolds directing said fluid from first manifold adjacent to said second edge of said material, through said material to said second manifold adjacent to said first edge of said material, while said material is in a region of lesser magnetic field;
    at least one thermal load exchange means;
    a heat rejection exchange means; and
    means for pumping and transporting fluid from said heat rejection exchange means through said first and second higher temperature manifolds to said thermal load exchange means, from said thermal load exchange means through said first and second lower temperature manifolds, then back to said heat rejection means.

2. The refrigeration apparatus of claim 1 wherein said fluid is helium.

3. The refrigeration apparatus of claim 1 wherein said magnetic field generating means is a superconducting magnetic and means for cooling it.

4. The refrigeration apparatus of claim 1 wherein said magnetic field generating means is a solenoidal-shaped magnet.

5. The refrigeration apparatus of claim 1 wherein said drive wheel frictionally engages said belt.

6. The refrigeration apparatus of claim 1 wherein said drive wheel has cogs which engage said belt.

7. The refrigeration apparatus of claim 1 wherein said magnetic field generating means surrounds at least two portions of said loop which are oppositely disposed across the longest axis of said loop.

8. The refrigeration apparatus of claim 7 further comprising third and fourth higher temperature fluid manifolds and third and fourth lower temperature fluid manifolds which direct fluid through said material to said thermal load exchange means or heat rejection exchange means as said first and second higher and lower temperature manifolds.

9. The refrigeration apparatus of claim 1 used to cool a second fluid by directing it through said thermal load exchange means.

10. The refrigeration apparatus of claim 9 wherein said second fluid is hydrogen.

11. The refrigeration apparatus of claim 10 wherein said hydrogen is cooled to a slush state.

12. The refrigeration apparatus of claim 10 wherein said hydrogen is cooled to a liquid state.

13. The refrigeration apparatus of claim 12 further comprising an ortho-to-para catalytic converter disposed in said thermal load exchange means.

14. The refrigeration apparatus of claim 13 wherein at least one additional ortho-to-para catalytic converter is disposed within said heat rejection exchange means.

15. The refrigeration apparatus of claim 9 wherein said second fluid is helium.

16. The refrigeration apparatus of claim 9 wherein said second fluid is neon.

17. The refrigeration apparatus of claim 16 wherein said neon is cooled to a liquid state.

18. The refrigeration apparatus of claim 9 wherein said second fluid is first directed through said heat rejection exchange means for precooling.

19. The refrigeration apparatus of claim 1 wherein said belt is a linked belt comprising frames flexibly attached to each other which contain said ferromagnetic or paramagnetic porous material.

20. The refrigeration apparatus of claim 19 wherein said frames of said linked belt contain blocks of said material.

21. The refrigeration apparatus of claim 20 wherein said blocks comprise a plurality of layers, said layer at said first edge composed of a substance having a Curie temperature near 15K and said layer near said second edge composed of a second substance having a Curie temperature near 85K, any interstitial layers composed of additional substances having increasing Curie temperatures from said first edge to said second edge in accordance with their location.

22. The refrigeration apparatus of claim 21 wherein said layers contain openings disposed substantially parallel to the movement of said fluid.

23. The refrigeration apparatus of claim 20 wherein said blocks comprise a plurality of sheets disposed substantially parallel to movement of said fluid, said sheets composed of a plurality of substances with the zone nearest said first edge having the greatest amount of a substance with a Curie temperature nearest 15K and the zone nearest said second edge having the greatest amount of a substance with a Curie temperature nearest 85K, any intervening zones having increasing amounts of a substance or substances with an increasing Curie temperatures in accordance with their location.

24. The refrigeration apparatus of claim 19 wherein said linked belt frames contain layered cages, said cages containing particles of said material.

25. The refrigeration apparatus of claim 1 further comprising means for directing fluid flow between said first higher and said first lower temperature manifolds to said second higher and said second lower temperature manifolds respectively, to a passage through said ferromagnetic or paramagnetic porous material.

26. The refrigeration apparatus of claim 1 wherein said material comprises one or more of the following compounds: $GdNi$, $GdPd$, $GdRh$, $ErAl_2$, $GdEr_{19}Al_{40}$, $Gd_2Er_{18}Al_{40}$, and $Gd_3Er_{17}Al_{40}$.

* * * * *